Figures 1, 2, 3:
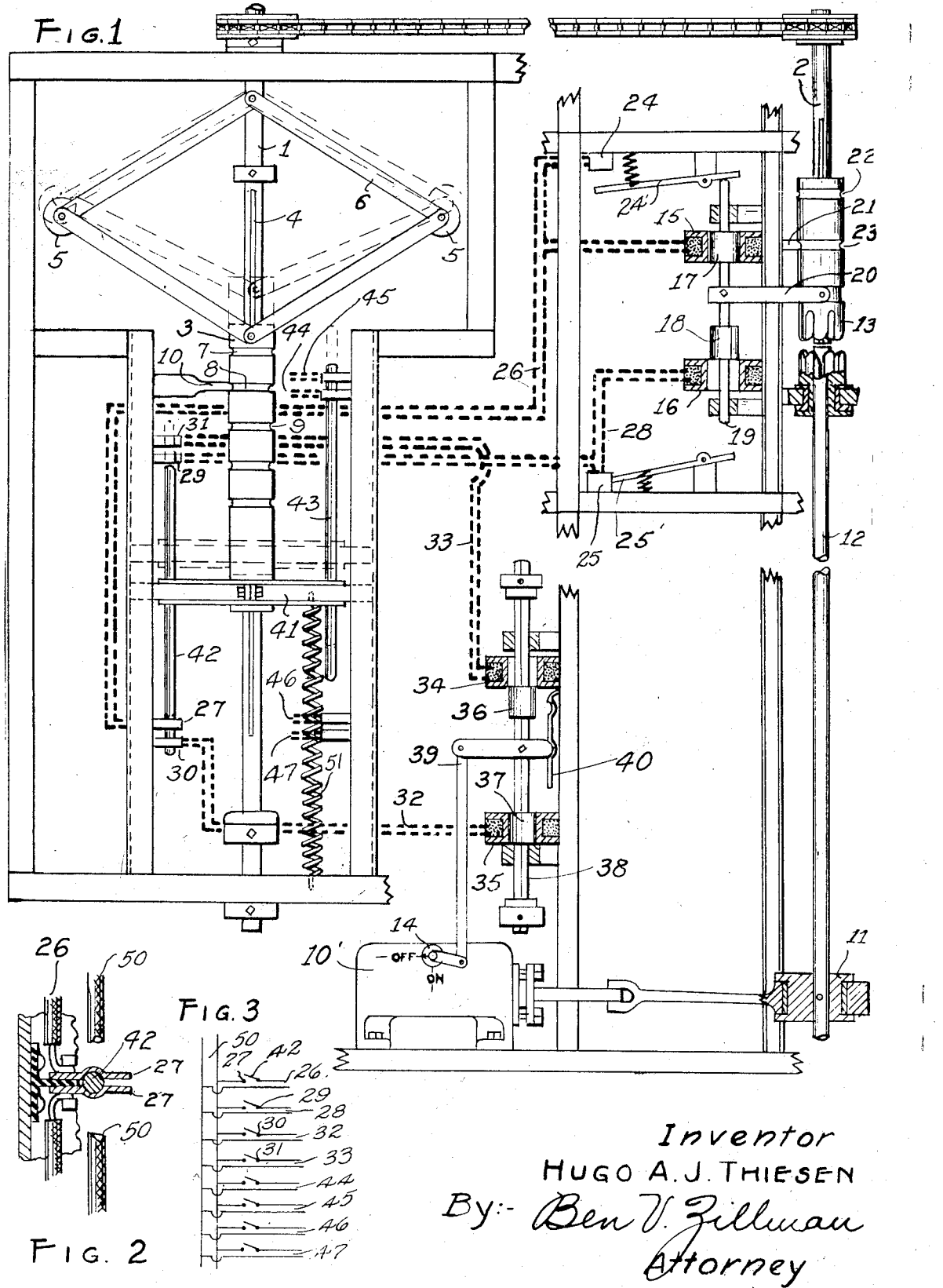

Aug. 7, 1945.    H. A. J. THIESEN    2,381,321
WORK-PRODUCING SPEED CONTROL
Filed Aug. 20, 1941

Inventor
HUGO A. J. THIESEN
By:- Ben V. Zillman
Attorney

Patented Aug. 7, 1945

2,381,321

UNITED STATES PATENT OFFICE 2,381,321

WORK-PRODUCING SPEED CONTROL

Hugo A. J. Thiesen, St. Louis, Mo.

Application August 20, 1941, Serial No. 407,613

1 Claim. (Cl. 175—355)

This invention relates broadly to speed-controls, but more particularly to a speed-control for a shaft or similar machine element that derives its actuating energy from a more or less inconstant source of power, as for example, from a natural source, such as wind, water, etc.

One of the objects of my invention is to provide a control for such a driven shaft, which will, in addition to simply slowing down said shaft to a safe speed, actually perform more useful work than is produced by said shaft at normal speeds.

Another object of my invention is to so construct such a speed control that the shaft of the kind described will have a weight slidably movably mounted thereon so as to be controlled in said movement by the speed of said shaft, and wherein there will be a series of control stations operable in sequence through the movement of said weight and whereby any desired number of work units may be thrown into or out of operation as the speed of said shaft varies.

The invention has among its other objects the construction of such a control for shafts driven through wind-mills, water-power, or through any similarly inconstant source of power, which will hold the speed within safe limits, perform a maximum of useful work, will be simple, economical, and otherwise satisfactory and efficient for use wherever deemed applicable.

Other objects of the device herein shown and described will be obvious to those skilled in the art to which this invention appertains, as will be apparent from the disclosures herein given.

To this end, my invention consists in the novel construction, arrangement and combination of parts herein shown and described, and the uses mentioned, as will be more clearly pointed out in the following specification.

In the drawing, wherein like reference characters indicate like or corresponding parts throughout the views, Figure 1 is a view partly in section, partly in elevation, and partly diagrammatical, to best show my invention;

Figure 2 is a detail view of a portion of the electrical connections of the same, and Figure 3 is a diagrammatic view illustrating the energizing of the control circuits from the main power line.

Referring more particularly to the drawing, wherein I have illustrated a preferred embodiment of my invention, 1 and 2 represent portions of shafts that are drivingly interconnected in any suitable manner so as to rotate in unison, and either of which as for example, the shaft 1, receives its rotative power from some prime mover, preferably a wind-mill, water-wheel, turbine, or the like, wherein the energizing force varies in intensity from time to time and over quite a range. The other shaft, as the shaft 2 in this instance, is drivingly connected to the first shaft so that both rotate in unison.

Sometimes the energizing force becomes so great that there is great danger of over-straining and breaking the elements and members so driven, and although it is a common expedient to interpose brakes and the like to absorb such undesired and excess power to thereby slow down the speed of the shaft thus driven, yet this method is obviously wasteful of the power generated.

My improved construction avoids such a waste of power, and upon the contrary, utilizes such excess power and slows down the speed of said shaft, by throwing into the line work-producing units, one after the other, until the speed is sufficiently lowered to be considered safe, and in a similar manner cutting these extra units out of the line as the energizing source of power fades to its minimum to just turn the shaft.

At some suitable point along the length of the shaft 1 I have arranged an elongated weight 3, the same being keyed to said shaft at 4 so that the shaft and weight rotate together but permit the weight to be shifted lengthwise of the shaft. The weights 5, 5 are carried at the outermost ends of a linkage frame 6, the upper end of the latter being secured to the shaft and the lower end secured to and carrying the weight 3, whereby as the shaft 1 is rotated, centrifugal action will cause the weights 5, 5 to shift radially as the speed of the shaft varies, and cause the weight 3 to be shifted longitudinally of the shaft.

As power from a natural source such as from wind, is hardly ever constant, I have so constructed my speed control that minor variations in speed of the power shaft will not cause a shifting of the control weight 3, and hence there will be no change in the power taken from the power shaft. However, if the speed is increased considerably there is an actuation of the control mechanism, as will now be set forth.

To that end, I have provided a series of longitudinally spaced, circumferentially extending grooves 7, 8, 9, etc., at spaced stations along said weight 3, the number of such grooves depending upon the number of work units that I use in sequence.

A resilient element, such as the spring 10 is fixed to any stationary structure, as shown, so that its end may yieldably engage within and ride in the grooves in the weight 3. Thus, it is seen that such an interlock temporarily resists and restrains the said weight from being shifted. However, as soon as the speed increases sufficiently to overcome the resistance of the spring 10 in interlock with the weight, the latter will be shifted suddenly to the next station, whereupon the spring will ride in the next corresponding groove. This shifting will take place in both directions of shift of the weight, dependent upon whether the speed drops or rises.

In the device illustrated, the lowest operating speed station will be when the spring is riding in the topmost groove 7. As soon as the speed increases sufficiently to lift the weight and overcome the resistance of the spring in the groove, the weight is shifted suddenly upwardly so that the spring next rides in the next adjacent groove or station 8, holding the weight there until the next appreciable speed change. If the next variance is a speed increase, the weight will again lift, bringing the spring into the groove 9, but if the speed drops, the weight drops too, and the spring re-engages with the groove 7.

Although the interconnection of the power-absorbing work units and the weight may be mechanical, I prefer to show the same as being electrically operated, as will now be described in detail. One of such work units may be the pump 10', placed at any suitable point, and driven through an eccentric 11 keyed to a shaft section 12, which is in turn releasably drivingly connectable through a clutch 13 to the shaft section 2, this clutch being of course non-rotatable, although slidable, on the last-mentioned shaft section.

This pump is provided with a stop cock or valve 14 for throwing the pump into idling or "off" position and into working or "on" position, upon reverse movements of said valve. I have found that if the valve and the said clutch are operated in a certain sequence, there will be easier and more complete movement of both of said elements, and therefore I prefer to place the cock into the "on" position immediately following the engagement of the clutch, and have so arranged the electrical circuits to effect this sequence.

A pair of electro-magnets 15 and 16 are mounted in spaced alignment, each having a core, 17 and 18 respectively, these cores being mounted on a common bar or rod 19 which in turn carries an arm or yoke 20 for engagement with the movable section of the clutch 13 for shifting the latter. A fixed spring element 21 engages selectively with either of a pair of longitudinally spaced grooves or stations 22, 23 on said clutch to yieldably hold the clutch section and the electro-magnet cores in either of their two positions.

A cut-out switch having a pair of fixed contacts 24, and a control contact element 24' movably mounted to operably engage the fixed contacts, is arranged so that the movable contact 24' moves with the movable part of the electro-magnet 15, and a similar switch 25—25' is arranged to cooperate in the same manner with the magnet 16. The switch 24—24' is in the electrical circuit 26 of the electro-magnet 15, leading from the pair of contacts 27—27, while the switch 25—25' is similarly interposed in the circuit 28 between the pair of contacts 29—29, and the electro-magnet 16. Fig. 2 shows one manner of mounting the fixed switch contacts, as for example the pair of contacts 27—27.

Adjacent the contacts 27—27 is another set of contacts 30—30, and similarly adjacent the contacts 29—29 is the set of contacts 31—31, the former being in the electrical circuit 32 and the latter in the circuit 33.

A pair of electro-magnets 34, 35 are spaced in alignment, each cooperating with its core 36 and 37 respectively mounted on a common bar or rod 38, the latter having fixed thereto a link-work 39 for throwing the valve 14 into "on" and "off" positions. A spring 40 may be employed for retaining the cores in any given position of adjustment, said spring yieldably engaging a member secured to the bar carrying said cores.

A carrier 41 is mounted on the weight 3 but free of any rotary drive connection therebetween, the carrier being guided for vertical movement somewhat as shown, said carrier carrying all of the movable contacts to coact with the fixed cooperating elements of the switches for the control of all electrical circuits for all of the work units. In the drawing, however, and for the sake of clearness and simplicity, but two such switches are shown, and indicated at 42 and 43. The movable switch contacts 42 and 43 are each of such length that when one end of the same is out of contact with its adjacent pair of fixed contacts and therefore out of circuit, the other end of the same is in contact and is in circuit. For example, in the drawing, the full lines show the element 42 as in open circuit at its top and in the closed circuit 32 at its bottom, while in dotted line position of said contact 42, the reverse order holds true.

The switch element 43 is similarly shown, though the circuits themselves are only partially indicated at 44, 45 and 46, 47, it being obvious that they may lead to and control in a similar manner, any work-absorbing unit, such as an air-compressor, generator, etc., but inasmuch as such additional work-units are not herein claimed, they will not be shown or described.

The various control circuits 26, 28, 32, 33, 44, 45, 46 and 47 may be energized from a common power supply line 50, somewhat as shown diagrammatically in Fig. 3.

In operation, and with the parts as shown, the switch element 42 is holding the pump in its "off" position, and the clutch is shown as disengaged. However, the first work unit (not shown) is in operation, the switch element 43 showing such unit's electrical circuits 44 and 45 as having been closed. Assume now, that the wind velocity, in the event that wind is the source of power, increases sufficiently to cause the weight 3 to snap past the spring and interlock with the latter at the next work station 9. At the latter station, the switch elements 42 and 43 are in the position shown in dotted lines, in which position the first work unit is still in operation, but in addition, the pump 10' is thrown into operation. The lift of the switch element 42 first closes the circuit 28, whereupon the electro-magnet 16 is energized to cause the clutch to inter-engage the shaft sections 2 and 12, then immediately break the said circuit, whereupon the clutch will remain engaged until the bar or rod 19 is positively reversed. As soon as the clutch is engaged the continuation of the movement of the switch element 42 closes the circuit 33 to energize the electro-magnet 34 to pull the core 36 upwardly and throw the pump cock or valve to "on" position of the pump.

The pump will then absorb the excess power while remaining in the last-described position. With a further increase of wind, other additional units may be placed in the power line in similar manner.

However, if the speed of the shaft 1 should drop sufficiently to overcome the spring interlock, the weight would snap back to permit the spring to interlock with the groove or station as shown in full lines, assisted by some form of retriever spring 51, as shown, and the members would resume their positions as indicated, the last work unit that was cut in, being the first to be cut out, of course.

What I claim as new and desire to secure by Letters Patent is:

In a speed control, a driving shaft, a driven shaft, a clutch movable between said shafts, a work-producing unit constantly drivingly connected to said driven shaft, control means for making movement of said work-producing unit selectively effective or ineffective to produce work, electrical means controlling the movement of said control means to its operative and inoperative positions, electrical means for controlling the movement of said clutch, a support structure carrying fixed switch contacts, a non-rotatable carrier axially movable on said driving shaft, switch elements on said carrier selectively engageable with the fixed contacts to control the electrical circuits at predetermined positions of said carrier, a fixed element yieldably interlocking with said carrier and partially retarding movement of the same, and means between said carrier and driving shaft and controlled by the speed of the latter to operably actuate said carrier.

HUGO A. J. THIESEN.